Sept. 20, 1960     J. P. SOULE     2,953,356
HEATING AND COOLING THERMOSTATIC CONTROL SYSTEM
Filed Nov. 1, 1957
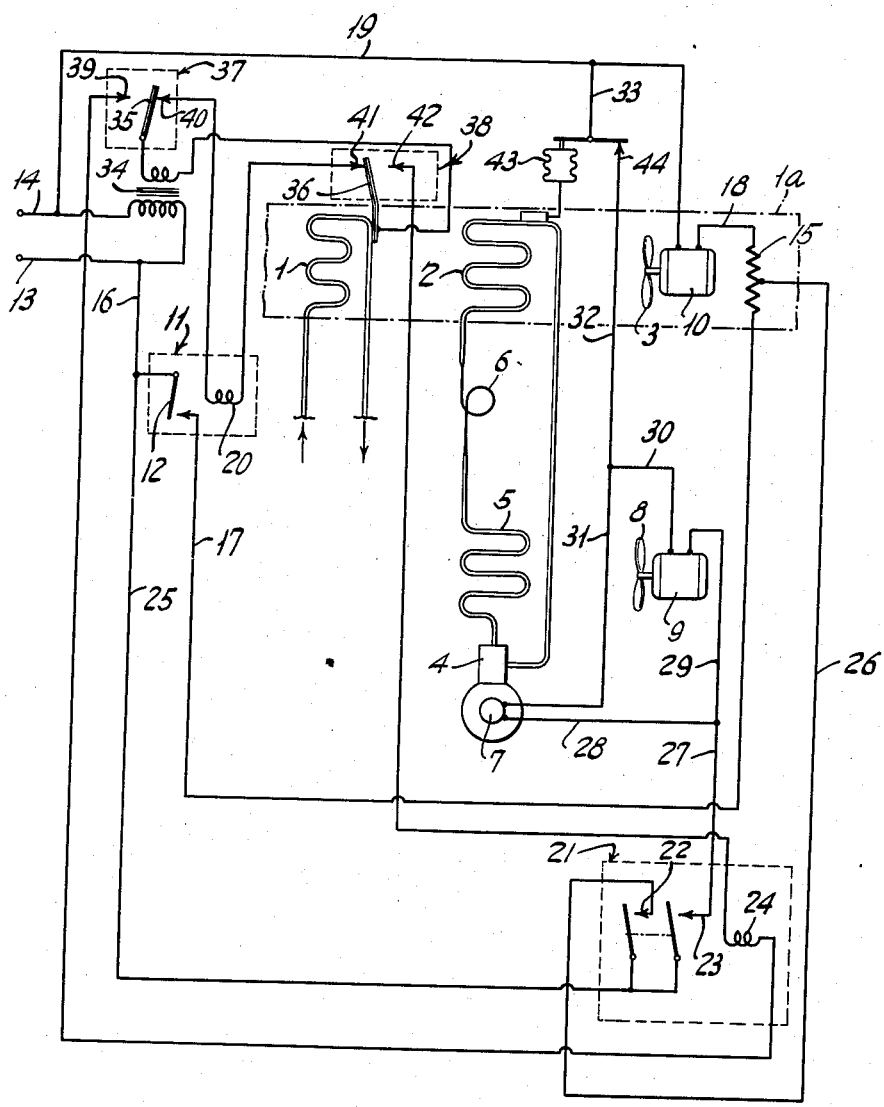
INVENTOR
JOHN P. SOULE
BY
ATTORNEY

United States Patent Office 2,953,356
Patented Sept. 20, 1960

2,953,356

HEATING AND COOLING THERMOSTATIC CONTROL SYSTEM

John P. Soule, Upper Montclair, N.J., assignor to American Radiator & Standard Sanitary Corporation, New York, N.Y., a corporation of Delaware Filed Nov. 1, 1957, Ser. No. 693,942

1 Claim. (Cl. 257—287)

This invention relates to thermostatic selective heating and cooling temperature control systems involving circulating heating and cooling mediums for year round air conditioning and more particularly to a self contained air conditioning unit which term is defined to mean an air conditioning unit for connection to a heating source supplying a heating medium on an interrupted basis but which does not affect or control the operation of said heating source and is automatically operable independently of any other air conditioning unit which may also be connected to said heating source.

Conventional systems normally comprise a heating system including a heating coil supplied with circulating steam or hot water on an interrupted basis from a central heating source, and a refrigeration system including an evaporator, condenser and compressor together with circulating fan means for conducting the hot or cold air from the unit. In such a system it is conventional to use a step down transformer for low voltage control of elements of the system through thermostatic switch means. It is also conventional to interlock the heat controls by placing a room thermostat and a heating coil thermostat in series in order that an air circulating fan for supplying air to the heating coil will not be started unless the heating coil is hot.

It is an object of my invention to provide an improved low voltage control system for year round operation of an air conditioning-heating unit and cooling unit in which the heating and cooling systems are automatically placed in operation responsive to the control of a single room thermostat and in which the heating coil must be at a predetermined low temperature, i.e., "cold" before the cooling system can operate.

Another object of my invention is to provide an improved low voltage interlocking system in which a thermostat on the heating coil must be at a low temperature and making a cold contact in order for the room thermostat when it calls for cooling to complete the refrigeration circuit and the air circulating circuit.

A further object is to provide an improved simplified and reliable low voltage control circuit for a heating and cooling system.

Another object of my invention is to proivde an improved low voltage thermostatic heating and cooling control system to produce efficient operation.

Further objects and advantages of the present invention will be apparent from the following description, reference being had to the accompanying drawing, wherein a preferred form of the invention is clearly shown.

In the drawing:

The single figure schematically shows a heating and cooling system for year round air conditioning embodying the thermostatic interlocking improvements of the present invention in a preferred form.

In the heating and cooling control system, heat is obtained from a heat exchanger such as the coil 1 positioned in a duct 1a and through which a heating medium such as steam or hot water is circulated on an interrupted basis from a conventional heating source (not shown). Cooling is obtained from a heat exchanger such as a cooling coil or evaporator 2 also in the duct 1a, the hot or cool air being circulated over or supplied to and conducted away from the heating coil 1 and evaporator 2 by a circulation fan or blower 3. The refrigeration system contains a compressible gas which is pumped by a compressor 4 to a condenser 5 for expansion through a capillary tube or expansion valve 6 to the evaporator 2 and return to the compressor 4. An electric motor 7 is provided to drive compressor 4. A condenser fan 8 driven by electric motor 9 provides circulating air for cooling condenser coil 5. Circulation fan 3 is powered by a multiple speed electric motor 10, preferably of the two-speed type.

In accordance with my invention I provide a simplified low voltage circuit for controlling, responsive to the demand of a single room thermostat and cooperating heat coil thermostat switch, the operation of the circulation fan 3 (on low speed) only when the heat coil 1 is hot and the operation both of the refrigeration system including the compressor 4, condenser fan 8 and of the circulation fan 3 (on high speed) only when the heat coil 1 is cool.

More particularly, to operate the circulation fan 3 at low speed, I provide a low voltage relay switch 11 having a normally open switch element 12 connected across voltage source lines 13 and 14 in series with motor 10 and a low speed resistor 15 through lines 16–19, inclusive. A low voltage solenoid coil 20 when energized closes switch 12.

To operate compressor 4, condenser fan 8 and circulation fan 3 (on high speed), I provide a second low voltage relay switch 21 having normally open contacts 22 and 23 and a low voltage solenoid coil 24 adapted when energized to close the contact means 22 and 23. Contact 22 serves to connect the motor 10 across the lines 13—14 in series with one half of the resistor 15 through lines 16, 25, 26, 18 and 19 to effect high speed operation of the fan 3. Contact 23 connects motors 7 and 9 in parallel across lines 13—14 through lines 16, 25, 27–33 and 19.

To energize the relay coils 20 and 24 I provide a transformer 34 having its high voltage winding connected to lines 13—14 and its secondary low voltage winding connected to bimetallic strips 35—36 respectively of a room thermostatic switch 37 and a second thermostatic switch 38 mounted on the heat coil 1. Switch 37 is provided with a cold contact 39 and a hot contact 40. Switch 38 is provided with a hot contact 41 and cold contact 42. The hot contacts 40 and 41 are connected to relay coil 20 to close switch 12 when both hot contacts are closed. Cold contacts 39 and 42 are connected to relay coil 24 to close switch elements 22 and 23 when both cold contacts are closed.

A bulb-type thermostat 43 having a normally closed switch element 44 is mounted on the evaporator coil 2 to interrupt communication between lines 32—33 on icing of the evaporator to stop the compressor 4 and fan 8.

*Operation*

In operation it is desirable that the circulation fan 3 remains inoperative unless there is heat in the heat coil 1 since under this condition there is no heat to circulate into the room and cold drafts are avoided. In the subject arrangement this feature is provided by interconnection of the hot contacts 40—41 through the relay coil 20. That is, if there is no heat in the heat coil 1, the hot contact 41 is open and relay coil 20 cannot be energized. On the other hand, if heat coil 1 is hot a call for room heat by closing of hot contact 40 of the room thermostat 37 completes the circuit between the transformer secondary and the relay coil 20 closing switch element 12 of relay switch 11 to energize motor 10 and start circulation fan 3.

It is understood that the subject system is used for year round air conditioning, that is, both heating and cooling of air. Should the room require heat on a cold morning and cool air in the afternoon as a result of sun during the day, there would be no point turning on the air cooling system if there was still steam on in the heat coil 1 due to continued operation of the central heat source (not shown). To avoid the possibility of uselessly running the compressor 4, condenser fan 8 and circulation fan 3 under this condition, the interlocked cold contacts 39 and 42 come into play. That is, although the room thermostat may automatically call for cooling by closure of the cold contact 39, the system will not operate as long as the heat coil 1 is hot and the cold contact 42 is open. On the other hand, if there is no heat in the heat coil 1 then cold contact 42 will be closed in conjunction with cold contact 39, the secondary of transformer 34 is connected in series with relay coil 24 to close switch elements 22—23 and the refrigeration system is brought into play.

It should be noted that the subject system is simple and efficient. All possible conditions of variation between heat or cooling demand and condition of the heat exchanger 1 are controlled by two thermostatic switches and two low voltage relay switches. Further the control is completely automatic under the operation of a single room thermostat.

While I have shown and described a particular embodiment of my invention, it will be obvious to those skilled in the art that various changes and modifications may be made without departing from my invention in its broader aspects, and I therefore aim in the appended claim to cover all such changes and modifications as fall within the true spirit and scope of my invention.

I claim:

A self-contained air conditioning unit for use with a source supplying a heating medium on an interrupted basis, comprising in combination, a heating coil for connection to said source, a refrigeration system including a compressor, an electric motor for driving said compressor, a condenser and an evaporator, means for circulating air over both said heating coil and said evaporator, a second motor for driving said means, an electrical system solely and automatically controlling the operation of motors for said unit, a transformer having a power-source energized primary and a low-voltage secondary, a room thermostat switch having a hot and a cold contact, a second thermostat switch positioned to be responsive solely to said heating coil and having a hot and a cold contact, a first relay having normally open contacts only and arranged to connect the power source to said air circulation motor when closed, a second relay having normally open contacts only and arranged to connect said power source to said air circulation and compressor motors in parallel when closed, each of said relays having a low-voltage contact closing coil, means connecting the coil of the first relay, said transformer secondary and the hot contacts of both thermostat switches in series to operate the air circulation motor only when both hot contacts close, means connecting the coil of the second relay, said transformer secondary and the cold contacts of both thermostat switches in series to operate the compressor and air circulation motors when both cold contacts close whereby the refrigeration system and the air circulation means can only be operated simultaneously when both cold contacts are closed thus preventing refrigeration system operation when there is residual heat in the heating coil.

References Cited in the file of this patent
UNITED STATES PATENTS

| | | |
|---|---|---|
| 2,137,833 | Crago | Nov. 22, 1938 |
| 2,155,256 | Crago | Apr. 18, 1939 |
| 2,176,852 | Campbell | Oct. 17, 1939 |
| 2,547,657 | Olsen | Apr. 3, 1951 |
| 2,704,571 | Reichelderfer | Mar. 22, 1955 |
| 2,724,577 | Murphy | Nov. 22, 1955 |